(12) United States Patent
Huang

(10) Patent No.: US 11,261,965 B2
(45) Date of Patent: Mar. 1, 2022

(54) RELEASE MECHANISM OF BRAKE DEVICE USED IN POWER TRANSMISSION PROCESS

(71) Applicant: Comeup Industries Inc., Taipei (TW)

(72) Inventor: Shih-Jyi Huang, Taipei (TW)

(73) Assignee: Comeup Industries Inc, Taipei (TW)

( * ) Notice: Subject to any disclaimer, the term of this patent is extended or adjusted under 35 U.S.C. 154(b) by 120 days.

(21) Appl. No.: 16/857,343

(22) Filed: Apr. 24, 2020

(65) Prior Publication Data

US 2021/0332884 A1     Oct. 28, 2021

(51) Int. Cl.
*F16H 63/30* (2006.01)
*F16H 63/34* (2006.01)

(52) U.S. Cl.
CPC ..... *F16H 63/3026* (2013.01); *F16H 63/3491* (2013.01)

(58) Field of Classification Search
CPC ... F16H 63/3026; F16H 63/3491; F16H 63/30
See application file for complete search history.

(56) References Cited

U.S. PATENT DOCUMENTS

| 2,644,492 A * | 7/1953 | Crane ................... B23D 55/10 83/819 |
| 3,945,757 A * | 3/1976 | Cummens ............. B23B 45/042 415/80 |
| 9,267,599 B2 * | 2/2016 | Pollack ............... F16H 63/3483 |
| 2015/0122068 A1 * | 5/2015 | Hopkins ............ F16H 63/3491 74/473.24 |

* cited by examiner

*Primary Examiner* — Huan Le
(74) *Attorney, Agent, or Firm* — Karin L. Williams; Alan D. Kamrath; Mayer & Williams PC

(57) ABSTRACT

In a release mechanism of a brake device used in a power transmission process, a motor supplies power, an output shaft of the motor is connected to the brake device, the brake device is formed by at least one friction disc and a brake disc, and a lining is installed on a side of the brake disc facing the friction disc, and a side is acted by an elastic member and attached with the friction disc to produce a braking effect. The release mechanism is connected to the brake device and capable of eliminating the braking effect of the brake device when needed, so that a machine can be operated to complete a stroke to improve the safety of use.

3 Claims, 15 Drawing Sheets

RELEASE MECHANISM OF BRAKE DEVICE USED IN POWER TRANSMISSION PROCESS

BACKGROUND OF THE INVENTION

Field of the Invention

The present invention relates to a release mechanism of a brake device, and more particularly to the release mechanism of the brake device used in a power transmission process, which can release the braking effect of the brake device when necessary.

Description of the Related Art

In the power transmission process of most machines, a brake device is installed to provide a direct or indirect braking effect to the power transmission of the machines. For example, a conventional power winch used for hanging or dragging a load usually uses the brake device in the power transmission process to control the movement of a rope (including but not limited to a steel wire rope or a synthetic rope). In another example, a conventional machine such as a printing machine, an injection molding machine, a car wash machine, etc. will use a motor to provide power and a transmission device driven by a motor to further drive other components to perform movements or actions such as rotation, bending, advancing, or retreating in a power transmission process. In the power transmission process, a brake device with a braking effect is installed for providing a direct or indirect braking effect timely in order to exercise a power transmission, and sometimes used for making a brake in order to change to a different movement, and sometimes designed for preventing damages or losses by making a brake automatically when error occurs. Therefore, the brake device is installed in various different machines for a power transmission process.

In another example, a power winch is used to illustrate the present invention. The principle of operating the power winch is to use a power source (such as a power motor or an electrical motor) to input transmission power in a forward or reverse direction. After the transmission power is acted by a reducer, a rope wheel is driven to rotate in a forward or reverse direction to release or rewind a rope (such as a steel wire rope or a synthetic rope) coiled around the rope wheel, and a hammer hook may be combined to a front end of the rope front and provided for hooking and hanging a load (such as a heavy object, another car or another object, etc.), so that the load can move with the rope. The main effect of the brake device used for the power transmission process of the power winch is to prevent a load or heavy object from falling down (that may causes injuries and damages) by braking the rope (which is a steel wire rope or a synthetic rope) when the motor is stopped (by power failure or by pressing a stop button accidently during the process of hanging or lifting a load) or when the motor is not in use (when the brake should be turned on). In other words, the brake device is a main device required in the power transmission process of the power winch. When the power winch is turned on and the motor normally ascends or descends the rope (either with or without hanging a load), the brake device will release the braking effect automatically in order to ascend or descend the rope successfully.

In a conventional brake device used in the power transmission process of the power winch, a common effect way is to push a brake lining by an elastic member, so that the brake lining moves forward and abuts against a friction disc to produce the braking effect. As described above, when the motor is stopped suddenly, the brake device elastically pushes the lining and abuts against the friction disc to stop the movement of the rope immediately, so as to prevent the load heavy object from falling down or causing accidents. When the motor is turned on, it is necessary to resist the elasticity of the elastic member and release the abutment between the brake lining and the friction disc to eliminate the braking effect, so that the power transmission can drive the rope to move. To eliminate the braking effect, various different mechanisms are available. Among these mechanisms, a "pneumatic pushing" method is relatively more convenient than others, wherein an air pressure is introduced at the moment of starting the motor in order to remove the abutment between the brake lining and the friction disc, so as to eliminate the braking effect.

Although the "pneumatic pushing method" is more convenient to eliminate the braking effect, yet when the mechanism for generating the air pressure fails (particularly the air generator fails to inflate air), this method may not be able to remove the abutment between the brake lining and the friction disc timely, so that braking effect cannot be eliminated. As a result, the power winch cannot be used, and the hanging heavy object is suspended in air. Obviously, the "pneumatic pushing method" has the risk of unable to use the whole machine (such as the power winch) and requires improvements.

SUMMARY OF THE INVENTION

In view of the aforementioned drawbacks of the prior art, wherein the braking effect of a machine cannot be eliminated during the power transmission process and the whole machine cannot be used, the inventor of the present invention, based on years of experience in the related industry conducting extensive research and experimentation, developed a release mechanism of a brake device used in a power transmission process, so that a release mechanism installed in a brake device used in a power transmission process can be used to release the braking effect by the release mechanism when needed (or when the brake device fails), and the power transmission can complete a stroke first or reach a safe status or position for a brake, and then the brake device can be repaired or maintained to improve the safety of the power transmission process.

Therefore, it is a primary objective of the present invention to provide a release mechanism capable of releasing the braking effect of a brake device when needed during a power transmission process, so as to improve the safety of use.

To achieve the above-mentioned objective, the present invention relates to a release mechanism of a brake device used in a power transmission process, and a motor providing power to the power transmission process, and an output shaft of the motor being coupled to the brake device, and the brake device being formed by at least one friction disc and a brake disc, and the brake disc having a lining installed on a side thereof and facing the friction disc, and a side of the brake disc is acted by an elastic member and attached with the friction disc to produce a braking effect, characterized in that a release mechanism is provided and coupled to the brake device, and the release mechanism comprises a positioning component, a release knob and a push rod, and the positioning component is installed at a machinery surface, and the front side has a positioning hole communicated with a via formed at the rear side; the release knob is passed and placed into a positioning hole of the positioning component, and the outer front side has a concave polygonal rotating slot, and the inner sidewall has a pushing slope with an inclination, and the center has a cylindrical groove; the front-end wall of the push rod has a pushed slope with an inclination, and the front end of the push rod has a front round push shaft extended outwardly therefrom, and an interval with a small distance exists between the positioning rod and the front round push shaft; a front round push shaft of the push rod is inserted into a cylindrical groove of the release knob, and when a pushing slope of the release knob and a pushed slope of the push rod are in a slope tight contact status, the rear end of the push rod and the friction disc have a direct or indirect connection relation; the release knob is driven to rotate from the concave polygonal rotating slot, and the pushing slope forces the pushed slope and the push rod to push the friction disc and the brake disc to produce a gap.

According to the above mentioned release mechanism of a brake device used in a power transmission process, the positioning component has a side positioning hole formed on a side thereof and inwardly accessed, and a circular positioning groove formed on a side of the release knob and configured to be corresponsive to the side positioning hole, and when the release knob is passed and placed into a positioning hole of the positioning component, a positioning member is passed and placed into the side positioning hole and pressed and positioned into the circular positioning groove.

According to the release mechanism of a brake device used in a power transmission process, the release knob has a group of symmetrical positioning slots formed on an inner sidewall thereof and at the periphery of the cylindrical groove, and a positioning rod erected from a front end of the push rod and adjacent to the front round push shaft, and the positioning rod is pressed and positioned into one of the positioning slots.

DETAILED DESCRIPTION OF THE PREFERRED EMBODIMENTS

The present invention will become clearer in light of the following detailed description of an illustrative embodiment of this invention described in connection with the drawings.

In the present invention, the title "Release mechanism of brake device used in power transmission process" refers to the existence of a "brake device" in a power transmission process of various different machines. Meanwhile, there is a "release mechanism" provided for eliminating the braking effect of the "brake device" when needed.

Figure 1:
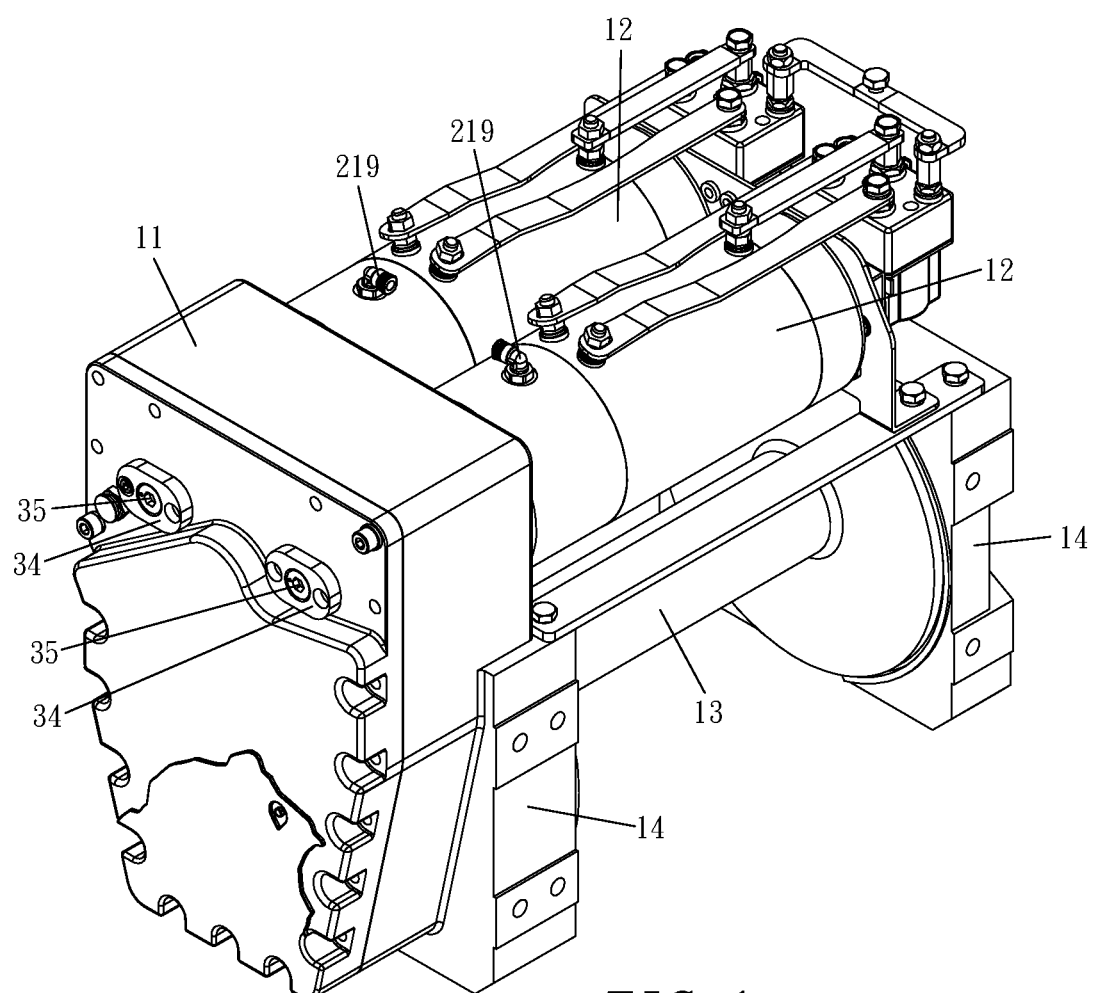
FIG. 1 is a perspective view of a dual motor power winch used as an example for illustrating the present invention.
Figure 2:
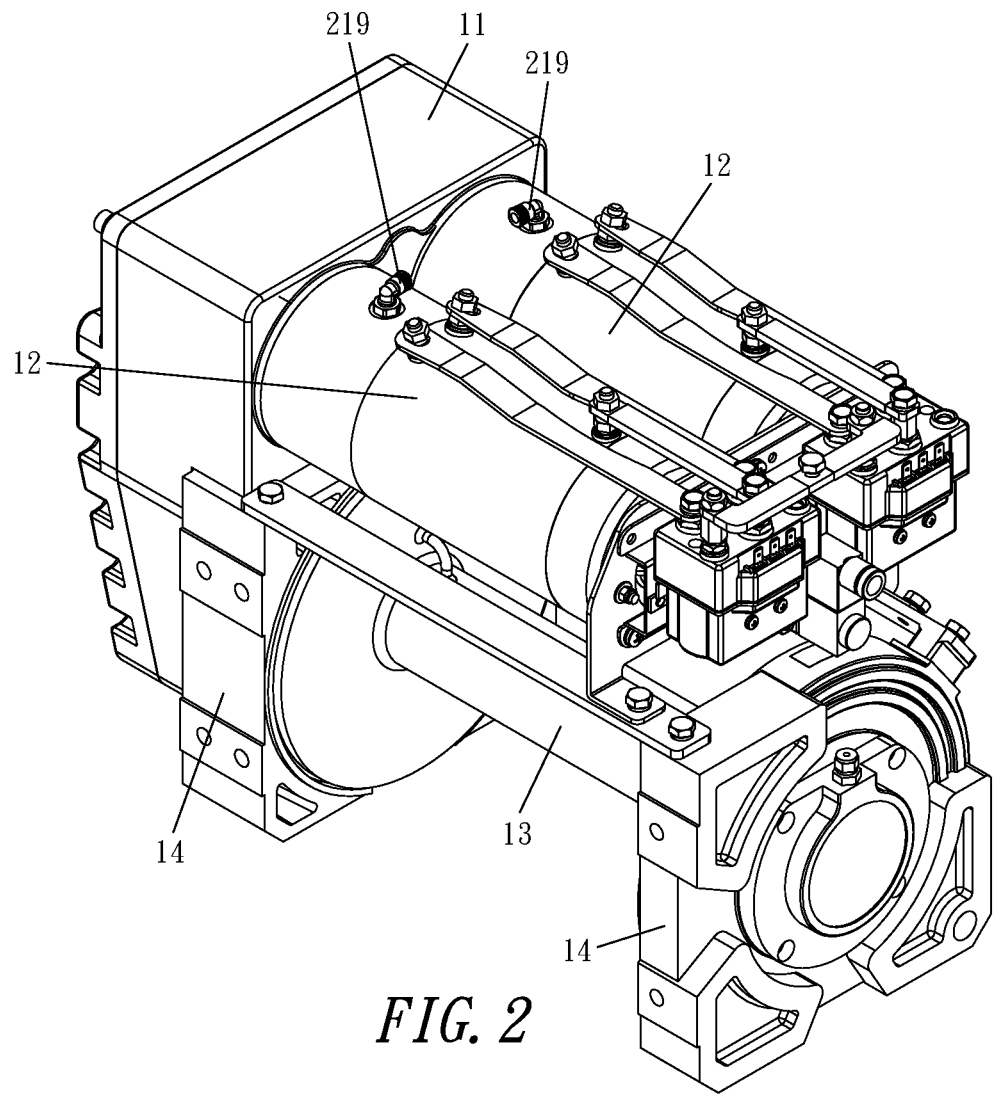
FIG. 2 is another perspective view of a dual motor power winch used as an example for illustrating the present invention.
Figure 3:
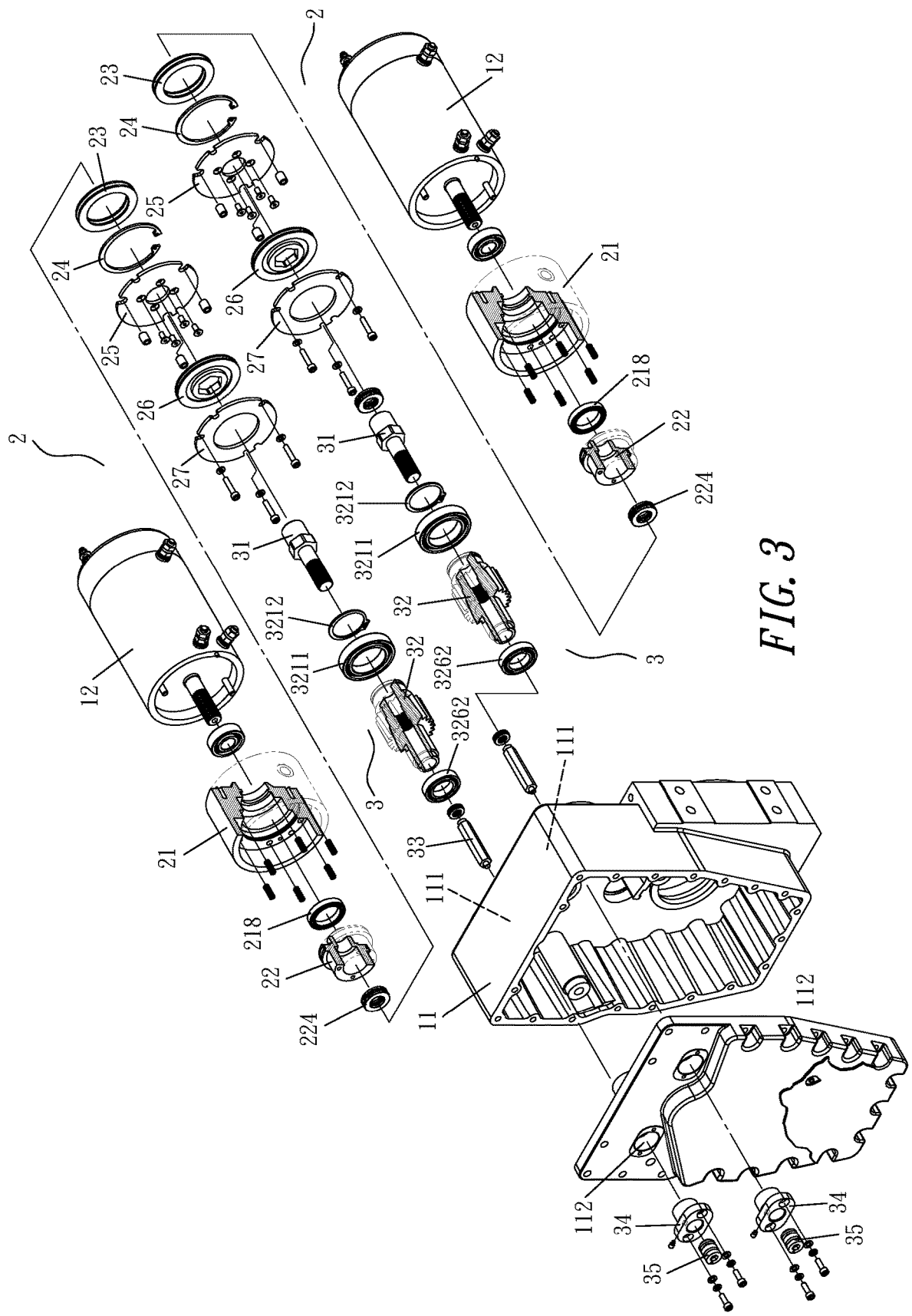
FIG. 3 is an exploded view of a dual motor power winch used as an example for illustrating the present invention.

To illustrate the present invention, a "power winch", such as a dual motor power winch, is used as an example of the machine. With reference to FIGS. 1 and 2 for a dual motor power winch, the dual motor power winch includes a transmission box 11, a plurality of fixed motors 12 installed on an outer side of the transmission box 11 to define a dual motor model, and the power of the plurality of motors 12 is transmitted into the transmission box 11 to jointly drive a transmission device (not shown in the figure) installed in the transmission box 11, so as to drive and rotate a rope wheel 13 installed at a position below the plurality of motors 12, so that a rope (such as a steel wire rope or a synthetic rope, not shown in the figure) is wound around the rope wheel 13 by a power control, and a motion of releasing or rewinding the rope (such as the steel wire rope or synthetic rope) can be performed when needed. The rope wheel 13 is supported by a support base 14. It is noteworthy that the dual motors 12 are installed independently for generating power separately, and there in no relevance between them, except all of their power is transmitted into the transmission box 11 to jointly drive the transmission device in the transmission box 11.

With reference to FIGS. 3 to 6, a brake device 2 and a release mechanism 3 are installed between the transmission box 11 and the motor 12. Since the dual motors 12 are installed independently and generate power separately, therefore the brake device 2 and the release mechanism 3 can exist independently and produce actions separately. It is noteworthy that there is no relevance between them, except that they exist symmetrically with respect to each other.

In FIGS. 3 to 5 and 7 to 9, a front-section surface of the output shaft 121 of the motor 12 has a plurality of engagement teeth 122, and a rear section of the output shaft 121 is coupled to a first bearing 123, and a surface of the root of the output shaft 121 root has a plurality of positioning rod 124 erected therefrom; the brake device 2 has an outer shell 21, and a corresponding surface of the output shaft 121 has a plurality of positioning slots 211 for inserting and positioning the positioning rods 124 in one-to-one correspondence during the installation, so that the outer shell 21 will not be rotated, and a central through hole 212 is formed at and penetrated through the axial center of the outer shell 21 for passing and installing the output shaft 121 non-contactly during the installation, and the central through hole 212 is expanded into a first accommodating groove 213 on a side facing the motor 12 and provided for plugging the first bearing 123 therein, while the other side of the first bearing 123 is pressing at a surface at the root of the output shaft 121, and the central through hole 212 on a side opposite to the motor 12 is expanded in the internal diameter into a second accommodating groove 214, a third accommodating groove 215, a fourth accommodating groove 216 and a fifth accommodating groove 217 sequentially, wherein the fourth accommodating groove 216 near the front edge has a ring slot 2161 formed on an inner side thereof, and the front edge of the fourth accommodating groove 216 is expanded outwardly into a plurality of upright slots 2162 (such as six upright slots 2161) and a plurality of connecting slots 2163 (such as three connecting slots 2163) formed around a side of the fifth accommodating groove 217, and the upright slot 2162 is provided for inserting and installing an elastic strip 2171 in one-to-one correspondence, and the second accommodating groove 214 is provided for plugging a second bearing 218 therein during the installation.

The brake device 2 includes a first intermediate actuator 22, a plug ring 221 extending towards a side of the outer shell 21 and having a central through slot 222 formed along an axial center thereof, and a side opposite to the outer shell 21 is formed into a sixth accommodating groove 223 by expanding its internal diameter, which is provided for plugging a third bearing 224 therein. Meanwhile, a plurality of upright connecting holes 225 (such as four upright connecting holes 225) is formed around a side thereof, and a circular wall with the largest diameter of the first intermediate actuator 22 has an oil seal ring 226 mounted thereon. During the installation, the plug ring 221 of the first intermediate actuator 22 is inserted and installed into the second bearing 218, so that the output shaft 121 can be passed through and installed into the central through hole 212 of the outer shell 21 non-contactly, and then passed through and installed into the central through slot 222 of the first intermediate actuator 22, and finally entered into a spatial range of the sixth accommodating groove 223 through the third bearing 224. In the process, the circular wall with the maximum diameter of the first intermediate actuator 22 and the oil seal ring 226 enter into a spatial range of the third accommodating groove 215, and a circular wall having the sixth accommodating groove 223 enters into a spatial range of the third accommodating groove 215 and the fourth accommodating groove 216.

The brake device 2 includes a middle ring 23 and a C-type retaining ring 24, and an oil seal ring 231 installed onto both outer and inner sides of the middle ring 23. During the installation, the middle ring 23 is installed into the fourth accommodating groove 216 and positioned therein, and then the C-type retaining ring 24 is plugged and positioned into the ring slot 2161 in order to limit the middle ring 23 to a fixed position.

The brake device 2 includes a first friction disc 25, a brake disc 26 and a second friction disc 27, wherein a penetrating hole 251 is formed at the center of the first friction disc 25, a plurality of passing holes 252 (such as four passing holes 252) is formed on an inner peripheral side near the penetrating hole 251 and a plurality of passing notches 253 (such as three passing notches 253) is formed on an external peripheral surface, and the passing hole 252 is provided for passing an engaging member 2521, and the passing notch 253 has a width just allowing a passing slot member 2531 to be installed and passed therein; an internal polygonal penetrating hole 261 such as an internal hexagonal penetrating hole 261 is formed at the center of the brake disc 26, a circular lining 262 is attached on both sides of the brake disc 26 separately, and a convex block 263 is formed around the internal polygonal penetrating hole 261 and protruded towards a side (such as a side of the second friction disc 27); a large penetrating hole 271 is formed at the center of the second friction disc 27, and a plurality of external peripheral surfaces (such as three surfaces) is disposed at the engaging notch 273, and the engaging notch 273 is configured to be corresponsive to the passing slot member 2531, the passing notch 253 and the connecting slot 2163 and has a width just for passing and installing an engaging member 274. In the installation, the engaging member 2521 is passed through the corresponding passing hole 252 and coupled to the corresponding upright connecting hole 225 of the first intermediate actuator 22 (by a screw or rivet connection), so that the first friction disc 25 and the first intermediate actuator 22 are assembled and coupled to each other. Now, outer ends of the elastic strips 2171 originally plugged into the upright slots 2162 jointly press a side of the first friction disc 25, and the convex block 263 of the brake disc 26 are set within a spatial range of the large penetrating hole 271 of the second friction disc 27, and the brake disc 26 and the second friction disc 27 are attached to each other, and then the engaging member 274 is passed through the corresponding engaging notch 273, and further passed through the passing slot member 2531. In the meantime, an end of the passing slot member 2531 is set into the passing notch 253, so that the engaging member 274 and the corresponding connecting slot 2163 are engaged with each other (by a screw or rivet connection). In such assembly with the elasticity of the plurality of elastic strips 2171, the linings 262 on both sides of the brake disc 26, the first friction disc 25 and the second friction disc 27 are attached with each other to achieve the braking effect.

Figure 6:
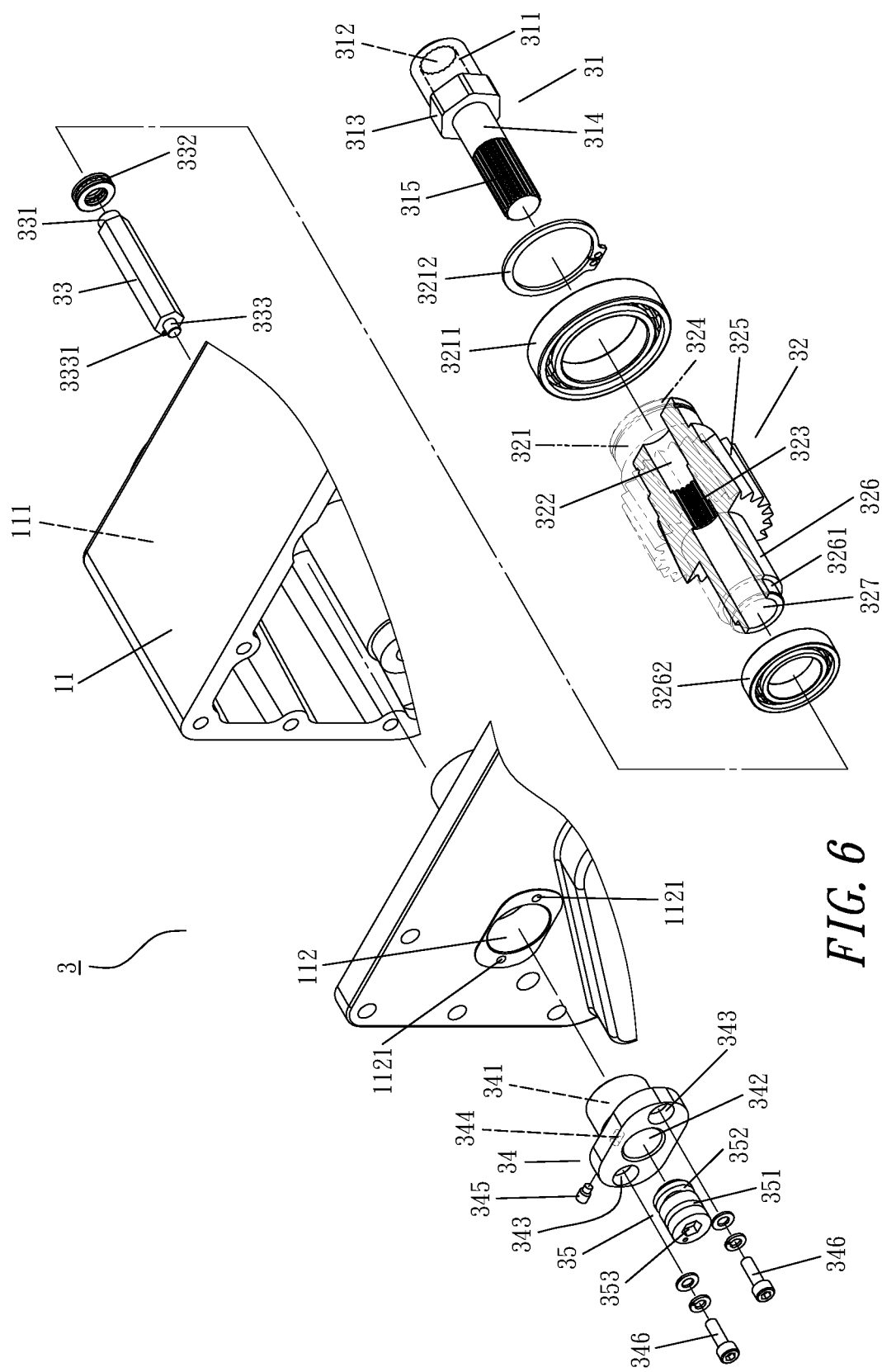
FIG. 6 is an exploded view of a release mechanism of a dual motor power winch used as an example for illustrating the present invention.
Figure 7:
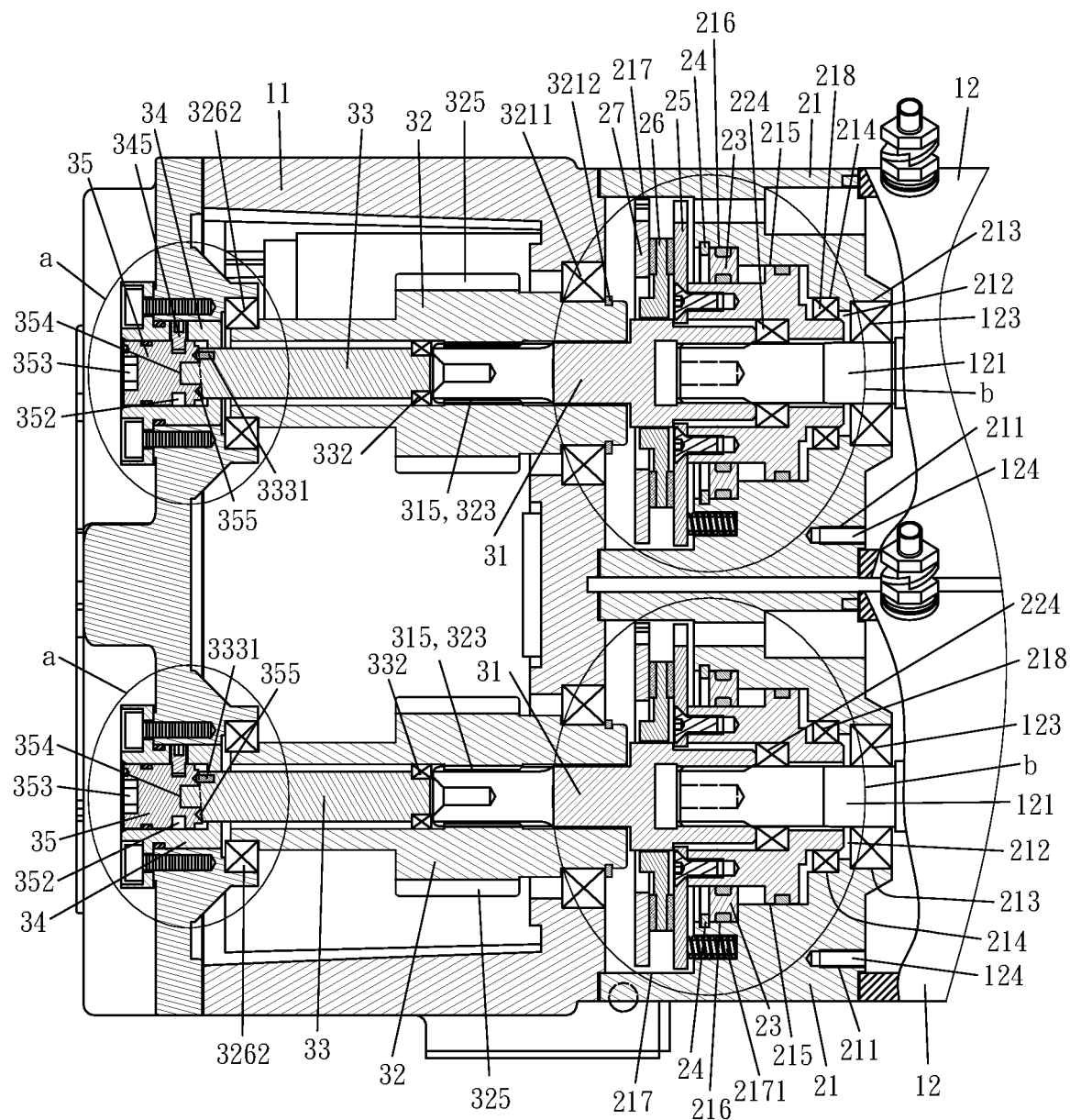
FIG. 7 is a cross-sectional view of a dual motor power winch used as an example for illustrating the present invention.
Figure 8A:
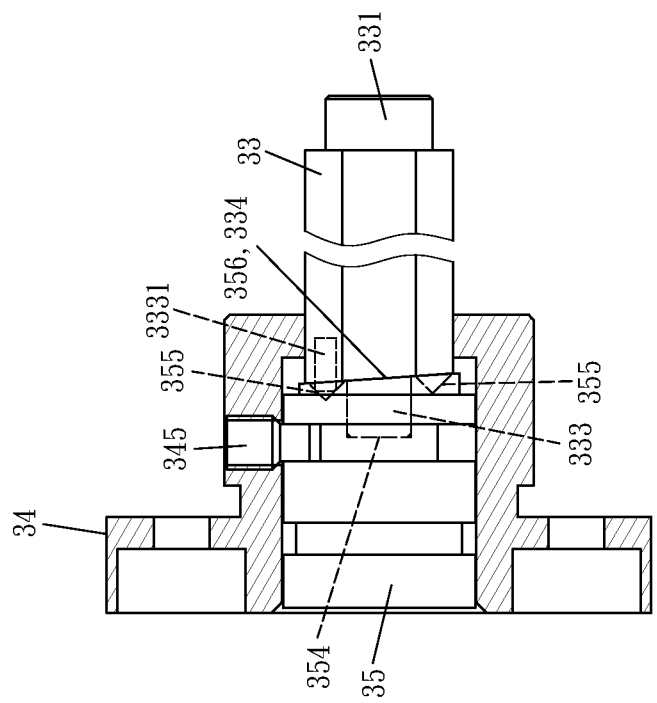
FIG. 8*a* is a schematic view showing the assembly of FIG. 8.
Figure 8:
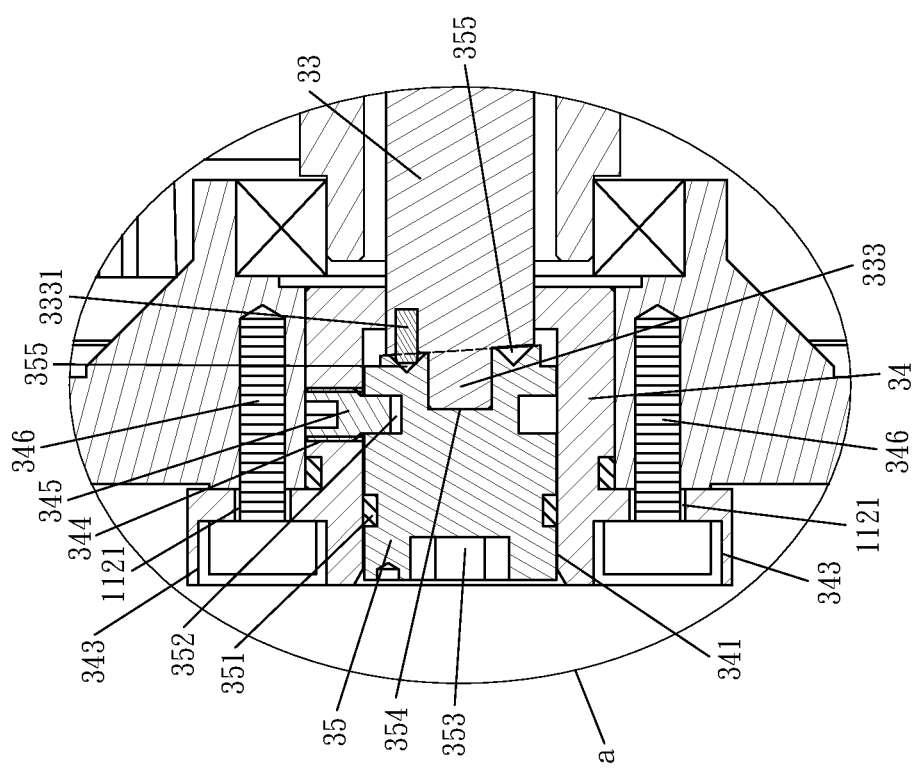
FIG. 8 is a blowup view of a part of FIG. 7.
Figure 9:
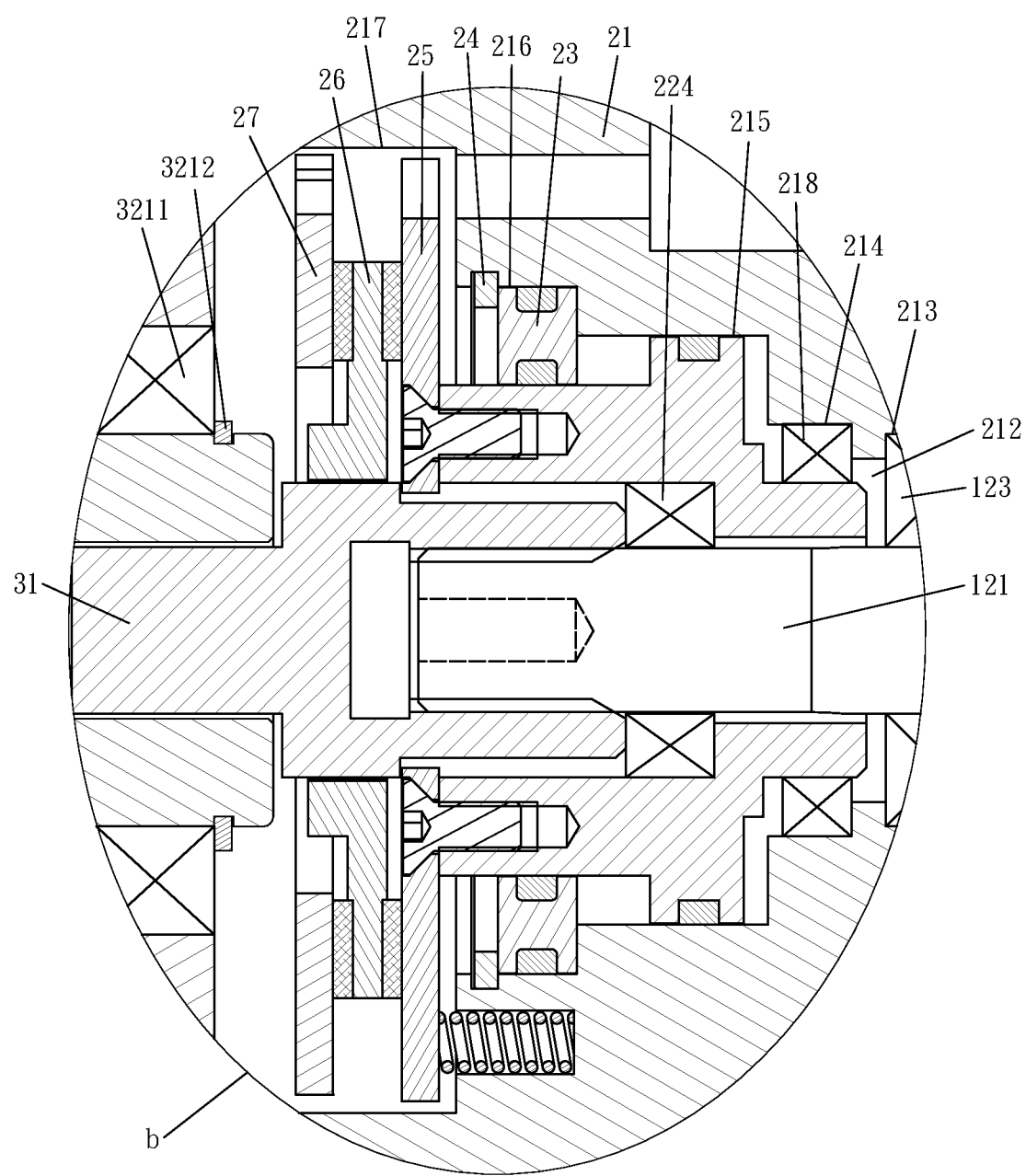
FIG. 9 is a blowup view of the part b of FIG. 7.

In FIGS. 3, 4 and 6 to 9, the release mechanism 3 includes a driving shaft 31, a circular wall 311 facing the brake device 2 and having an engaging ring gear 312 installed into the circular wall 311 and engaged with the engagement tooth 122 on the front-section surface of the output shaft 121, and the middle section of the driving shaft 31 is an external polygonal convex block 313 such as an external hexagonal convex block accommodated into the internal polygonal penetrating hole 261 of the corresponding brake disc 26, and a side of the driving shaft 31 facing the back of the brake device 2 is extended to form a segment rod 314, whose outer-section surface has a plurality of engagement teeth 315. In the installation, the circular wall 311 of the driving shaft 31 extends into a position within the spatial range of the sixth accommodating groove 223 of the first intermediate actuator 22 and situated between the output shaft 121 and the first intermediate actuator 22, until an edge of the external polygonal convex block 313 abuts a bottom edge of the first friction disc 25 (as shown in FIGS. 7 and 9). In the process, the engaging ring gear 312 in the circular wall 311 is engaged precisely with the engagement tooth 122 of the output shaft 121, while the external polygonal convex block 313 is precisely received into the internal polygonal penetrating hole 261 of the brake disc 26, so that when the output shaft 121 rotates, the driving shaft 31 and the brake disc 26 are driven to rotate synchronously. After the installation, the segment rod 314 of the driving shaft 31 is extended into the spatial range of the transmission box 11.

The release mechanism 3 includes a second intermediate actuator 32, a front segment rod 321 disposed on a side facing the driving shaft 31, a penetrating hole slot 322 formed at the center, an engaging ring gear 323 disposed at a position near the middle inside the penetrating hole slot 322, a ring slot 324 formed on the front segment rod 321 and having a middle outer edge formed into a gear tooth 325 with an expanded external diameter, and a rear segment rod 326 disposed on a side facing the back of the driving shaft 31 and having a rear section formed into a sheathing section with a reduced external diameter, wherein the penetrating hole slot 322 is communicated to the rear end to form a rear opening 327. In the installation, a fourth bearing 3211 of the second intermediate actuator 32 is sheathed on the front segment rod 321, and a C-type retaining ring 3212 is inserted and positioned into the ring slot 324 to limit the fourth bearing 3211 at a fixed position, and then the penetrating hole slot 322 of the second intermediate actuator 32 is aligned precisely with the segment rod 314 of the driving shaft 31 and inserted until the engaging ring gear 323 in the penetrating hole slot 322 is engaged with the engagement tooth 315 on the corresponding segment rod 314. In the meantime, the front edge of the front segment rod 321 is adjacent to a turning point of the joint between the external polygonal convex block 313 and the segment rod 314, and then a fifth bearing 3262 is sheathed on a position of the sheathing section 3261, and finally the second intermediate actuator 32 is extended from a penetrating hole 111 on a side of the transmission box 11 into the transmission box 11.

Figure 4:
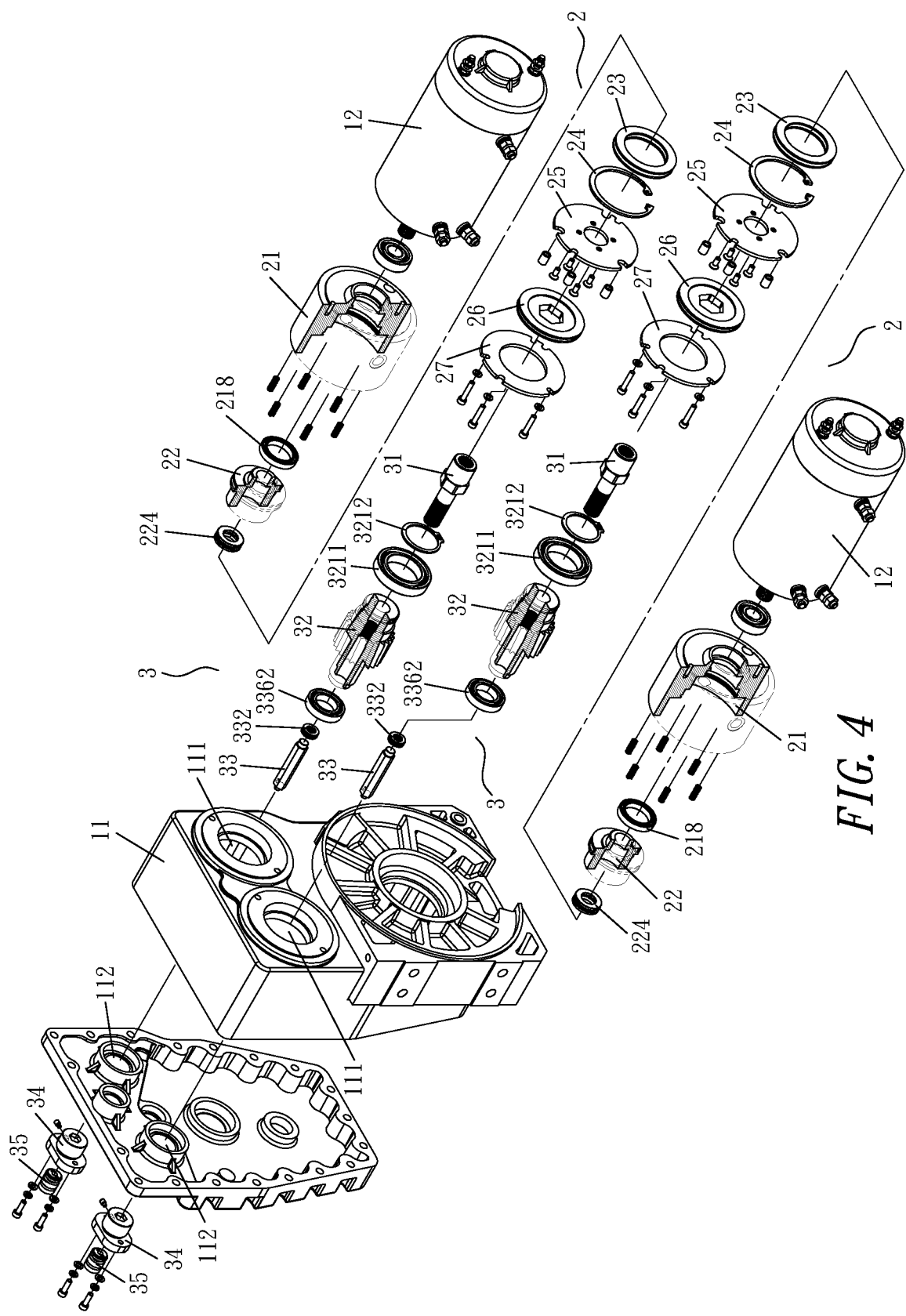
FIG. 4 is another exploded view of a dual motor power winch used as an example for illustrating the present invention.
Figure 5:
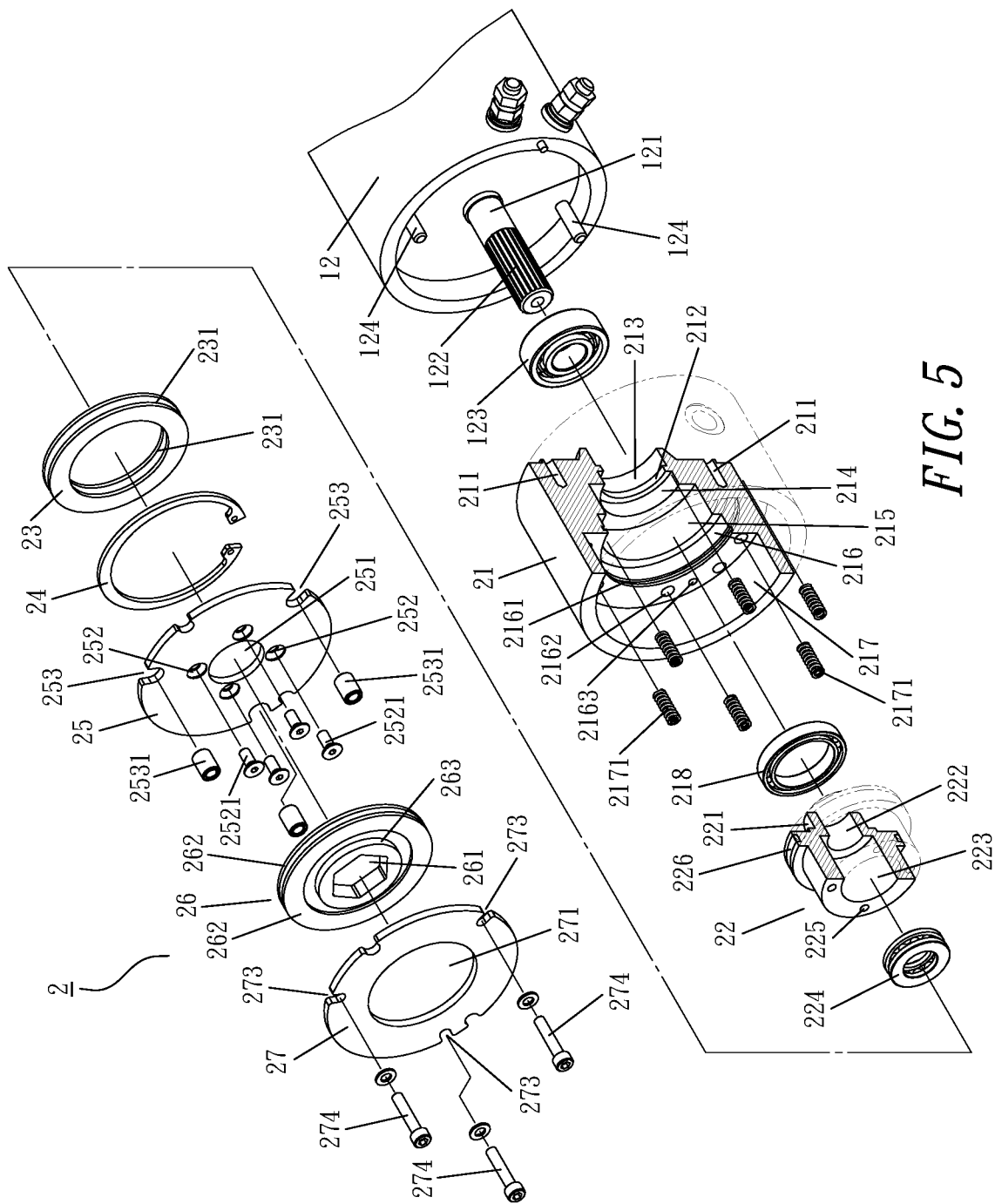
FIG. 5 is an exploded view of a brake device of a dual motor power winch used as an example for illustrating the present invention.

The release mechanism 3 includes a push rod 33 in a polygonal (such as a hexagonal) shape, a rear round push shaft 331 with a decreased outer diameter is extended from the rear end thereof, a sixth bearing 332 precisely sheathed on an outer wall of the rear round push shaft 331, a front round push shaft 333 with a decreased outer diameter is extended from a front end of the push rod 33, and a positioning rod 3331 erected from a front-end wall of the push rod 33, wherein a gap with a small distance exists between the positioning rod 3331 and the front round push shaft 333. It is noteworthy that a pushed slope 334 (as shown in FIG. 8a) with an inclination is disposed on a front-end wall of the push rod 33. In the installation, the rear round push shaft 331 of the push rod 33 together with an end of the sixth bearing 332 are passed through a rear opening 327 of the second intermediate actuator 32 and entered into the penetrating hole slot 322 until an end of the rear round push shaft 331 abuts an end of the driving shaft 31, and then a cover outside the transmission box 11 is covered onto the transmission box 11, and the fifth bearing 3262 originally sheathed on the sheathing section 3261 of the second intermediate actuator 32, the front round push shaft 333 of the push rod 33, and a part of the positioning rod 3331 will be entered from an inner side of a penetrating hole 112 formed on the cover of the transmission box 11, and the penetrating hole 112 is passed forward and communicated with the outside of the cover of the transmission box 11 (as shown in FIGS. 4 and 6), and both sides of the penetrating hole 112 have a joint hole 1121 separately.

The release mechanism 3 includes a positioning component 34 having a via 341 formed on a rear wall thereof and passed inside to communicate with an internal hollow space, and further communicated with a positioning hole 342 on the front wall, and both sides of the positioning hole 342 have a joint penetrating hole 343 separately for passing a corresponding engaging member 346, and the rear wall has a side positioning hole 344 formed on a side thereof and provided for passing a positioning member 345. The release mechanism 3 includes a release knob 35 being a cylindrical block passed and entered into the positioning hole 342 of the positioning component 34, and the block has an oil seal ring 351, and a circular positioning groove 352 is formed at a position corresponding to the side positioning hole 344 of the positioning component 34, and a concave polygonal rotating slot 353 such as a concave hexagonal rotating slot is formed on the outer front side, and then a cylindrical groove 354 is formed at the center of an inner sidewall of the release knob 35 and a plurality of positioning slots 355 (such as two positioning slots 355) is concavely and symmetrically formed at the periphery (as shown in FIGS. 4, 7, 8, and 8a). It is noteworthy that an inner sidewall of the release knob 35 is formed into a pushing slope 356 with an inclination, and the pushing slope 356 and the pushed slope 334 have an inclination correspondence with each other (as shown in FIG. 8a). In the installation, the release knob 35 is installed from the positioning hole 342 on the front side of the positioning component 34, so that the oil seal ring 351 attaches onto the inner wall of the positioning hole 342 inner wall until the circular positioning groove 352 is aligned precisely with the side positioning hole 344 of the positioning component 34, and then the positioning member 345 is screwed and entered from the side positioning hole 344 and fixed into the circular positioning groove 352, so as to latch the release knob 35 and prevent it from separating from the positioning component 34, and then the positioning component 34 (together with the release knob 35) is passed from an outer side of the penetrating hole 112. Now, the front round push shaft 333 of the push rod 33 and the positioning rod 3331 will pass through the via 341 of the positioning component 34, and the front round push shaft 333 will precisely enter into the cylindrical groove 354 formed at the center of the inner sidewall of the release knob 35 inner sidewall and positioned at a fixed position, and an outer end of the positioning rod 3331 will precisely enter into one of the positioning slots 355, while joint the penetrating hole 343 of the positioning component 34 will be aligned precisely with the joint hole 1121, so that after the engaging member 346 is passed through the joint penetrating hole 343 and coupled to a wall inside the joint hole 1121 (by a screw or rivet connection). After the installation, the pushing slope 356 and the pushed slope 334 are situated at a slope tight contact status as shown in FIG. 8a.

The release mechanism 3 comprises a push rod 33 in a polygonal (such as a hexagonal) shape, a rear round push shaft 331 with a decreased outer diameter is extended from the rear end thereof, a sixth bearing 332 precisely sheathed on an outer wall of the rear round push shaft 331, a front round push shaft 333 with a decreased outer diameter is extended from a front end of the push rod 33, and a positioning rod 3331 erected from a front-end wall of the push rod 33, wherein a gap with a small distance exists between the positioning rod 3331 and the front round push shaft 333. It is noteworthy that a pushed slope 334 (as shown in FIG. 8a) with an inclination is disposed on a front-end wall of the push rod 33. In the installation, the rear round push shaft 331 of the push rod 33 together with an end of the sixth bearing 332 are passed through a rear opening 327 of the second intermediate actuator 32 and entered into the penetrating hole slot 322 until an end of the rear round push shaft 331 abuts an end of After the installation as shown in FIG. 7, the pushing slope 356 and the pushed slope 334 are situated in a slope tight contact status, so that the front round push shaft 333 of the push rod 33 is pressed completely into the cylindrical groove 354. In the meantime, an outer end of the positioning rod 3331 is entered into one of the positioning slots 355 and remained at a fixed position (as shown in FIGS. 8 and 8a). Due to the elasticity of the elastic strip 2171, the first friction disc 25 is pushed and compressed in a direction towards the brake disc 26 and the second friction disc 27. In addition, the linings 262 on both sides of the brake disc 26 further improve the friction effect, so that the second friction disc 27, the brake disc 26 and the first friction disc 25 are attached closely with each other to achieve the braking effect (as shown in FIG. 9), and such braking effect keeps the brake disc 26 from rotating. Once the brake disc 26 cannot rotate, the driving shaft 31 and the output shaft 121 are forced to stop rotating. In other words, the whole system stops the horse power immediately, and a braking effect of the machine can be produced timely.

In the braking status as shown in FIGS. 7 to 9, a device for releasing the braking effect is generally provided to allow the input of power to the motor for the operation again. In a dual motor power winch as shown in FIGS. 1 and 2, the dual motor power winch includes an intake nozzle 219 coupled to an air intake pipe of an air intake device and passed and communicated with a space where the second friction disc 27, the brake disc 26 and the first friction disc 25 are situated. Once the air intake operation is started, air pressure will push the first friction disc 25 to resist the elasticity of the elastic strip 2171 and move in a direction away from the brake disc 26, so that a gap is produced between the second friction disc 27, the brake disc 26 and the first friction disc 25 to release the braking effect, and the brake disc 26 and the driving shaft 31 can be driven by the output shaft 121 to rotate and perform the power transmission operation.

Figure 10:
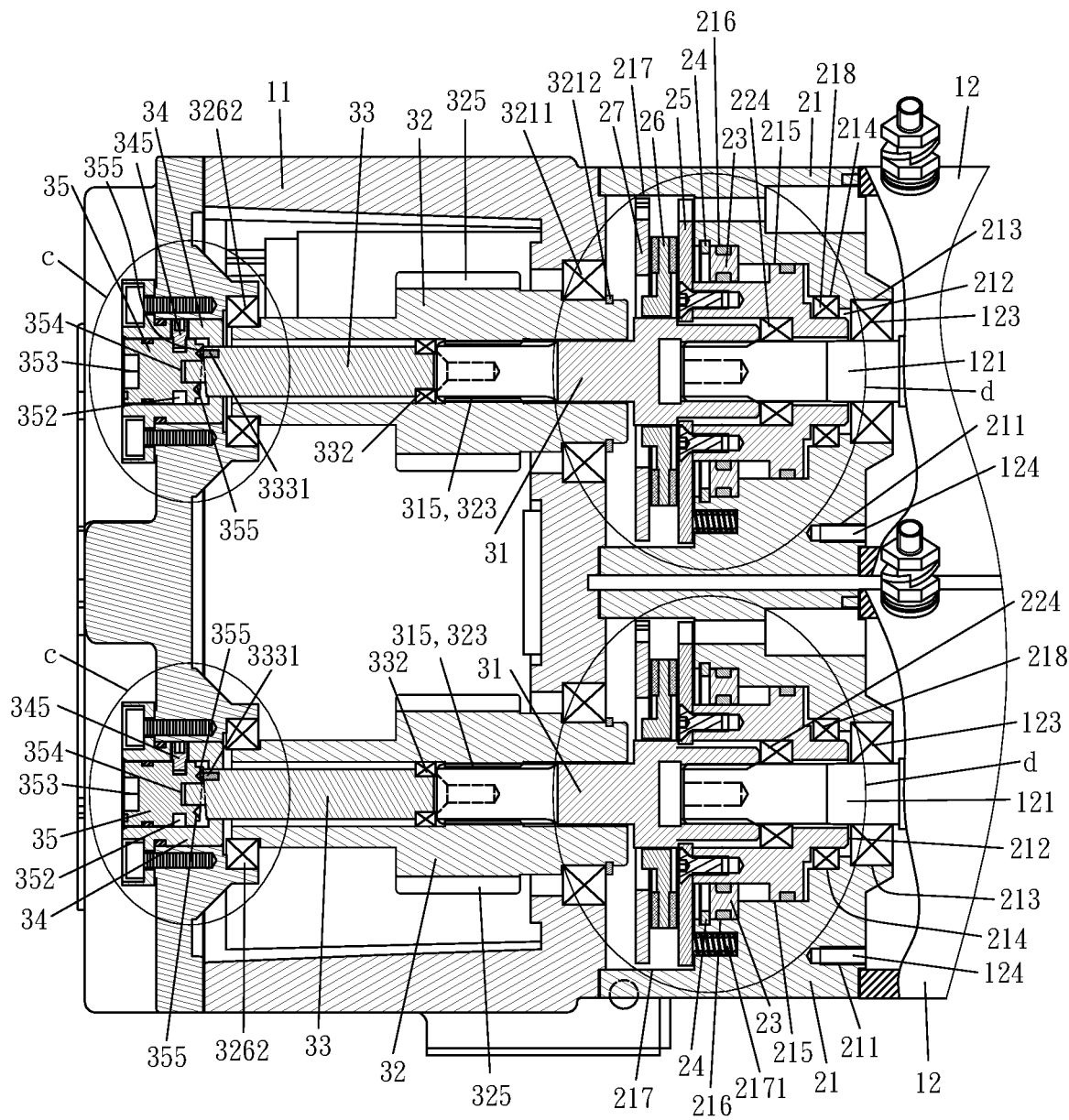
FIG. 10 is a schematic view showing a brake releasing effect of a dual motor power winch used as an example for illustrating the present invention.
Figure 11A:
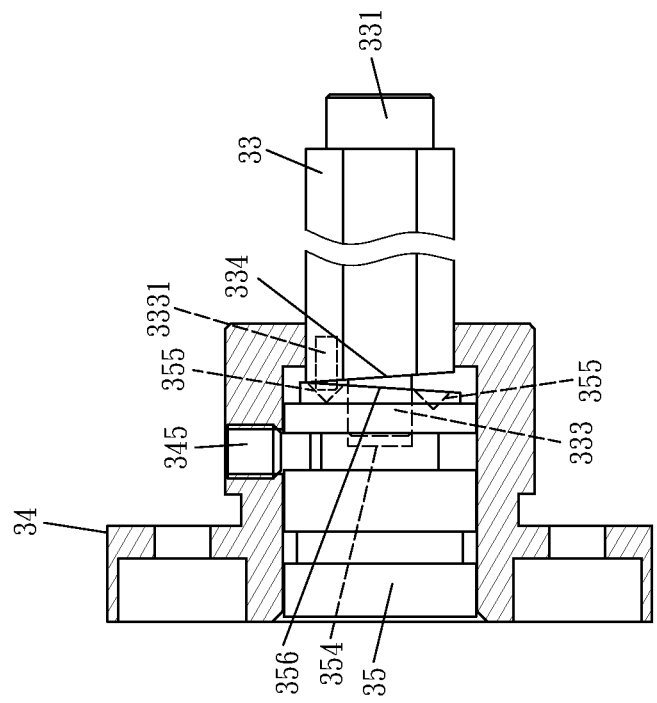
FIG. 11*a* is a schematic view showing the effect of FIG. 11.
Figure 11:
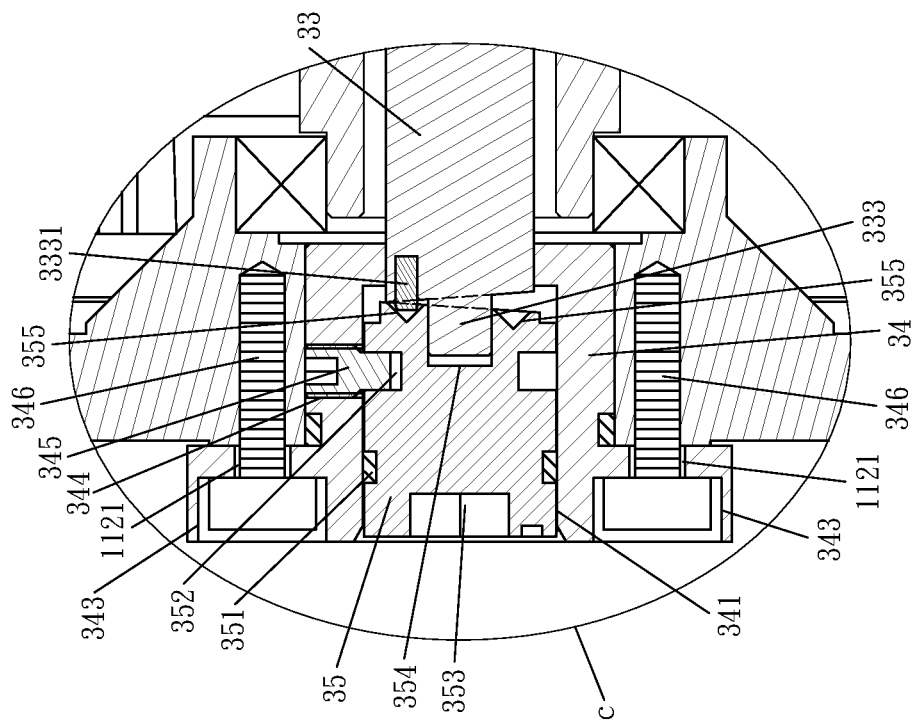
FIG. 11 is a blowup view of the part c of FIG. 10.
Figure 12:
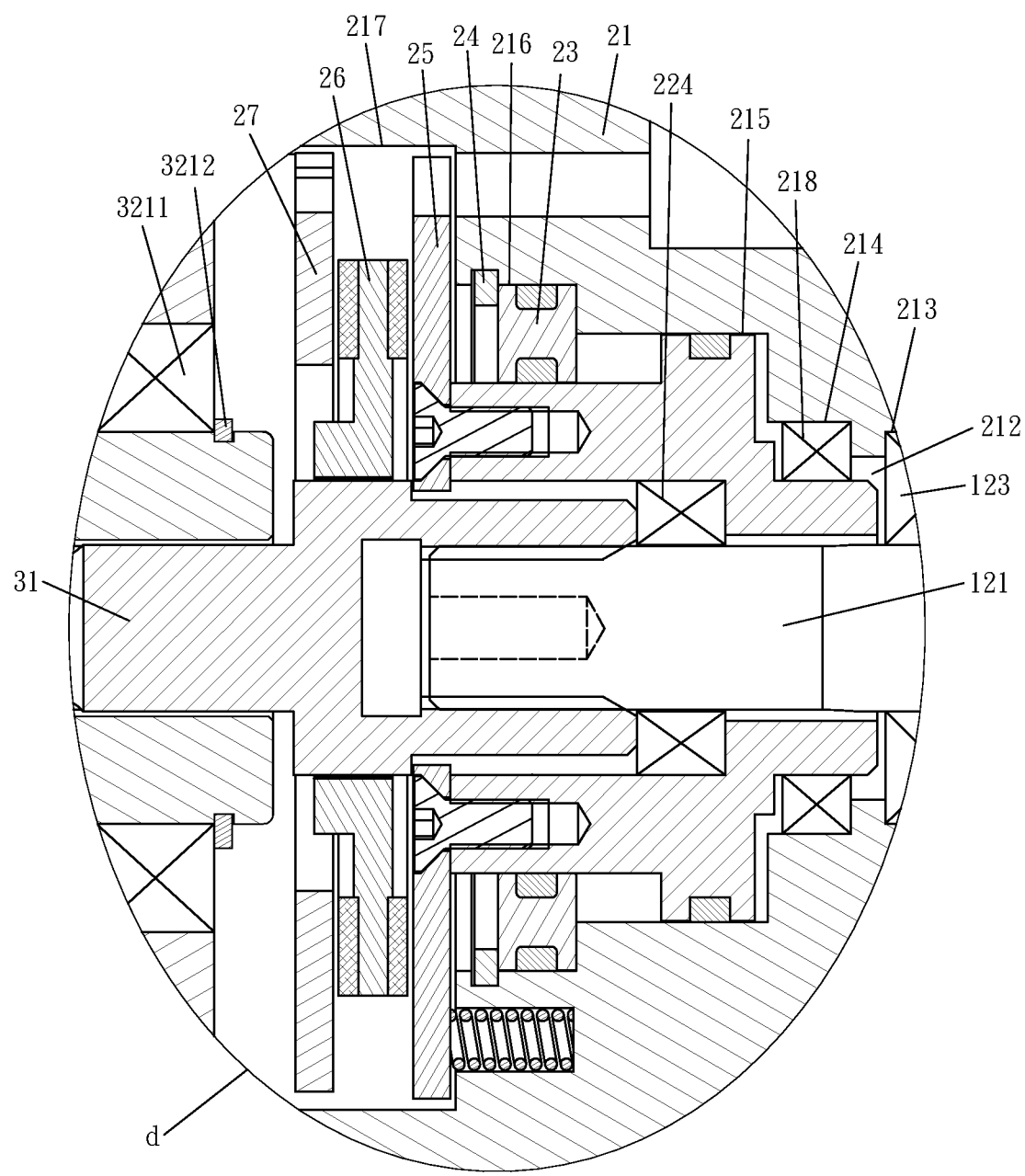
FIG. 12 is a blowup view of the part d of FIG. 10.

In a normal operation, when the device for releasing the braking effect fails (for example, when the air intake device coupled to the intake nozzle 219 fails), the braking effect cannot be eliminated, so that the machine (such as the dual motor power winch) cannot be used normally. However, the present invention provides a release device 3 to release the braking effect, wherein a bent polygonal rotating rod (such as a hexagonal wrench) is installed into the concave polygonal rotating slot 353 of the release knob 35 to drive the release knob 35 to rotate for an angle of 180 degrees as shown in FIGS. 10 to 12. In this process, the push rod 33 cannot be rotated (but it just can be move back and forth only), so that the rotation of the pushing slope 356 forces the pushed slope 334 and the push rod 33 to move in a small distance towards the first friction disc 25 (as shown in FIGS. 11 and 11a), and such movement pushes the first friction disc 25 to resist the elasticity of the elastic strips 2171 and move in a direction away from the brake disc 2, so that a gap is produced between the second friction disc 27, the brake disc 26 and the first friction disc 25 to eliminate the braking effect (as shown in FIG. 12), and operate the machine to complete stroke, and then maintenance and repair can be conducted immediately to return the mechanism to normal. In the rotation of the release knob 35, the two symmetrical positioning slots 355 are rotated accordingly, so that the positioning rod 3331 originally pressing at one of the positioning slots 355 will press another positioning slot 355 instead, and the positioning effect of the positioning rod 3331 pressing into any positioning slot 355 gives the operator a hand feel of reaching the desired position. When the machine returns to normal, it is necessary to rotate the release knob 35 for 180 degrees (in a reverse direction) again in order to press and position the positioning rod 3331 into the original positioning slot 355 again.

In FIGS. 1 and 2, the dual motor power winch is used as an example of the machine for illustrating this invention. In the power transmission process, a brake device 2 and a release mechanism 3 are provided, and the release mechanism 3 is provided for eliminating the braking effect of the brake device 2, and a tri motor power winch is further used as an example of the machine for illustrating the invention.

Figure 13:
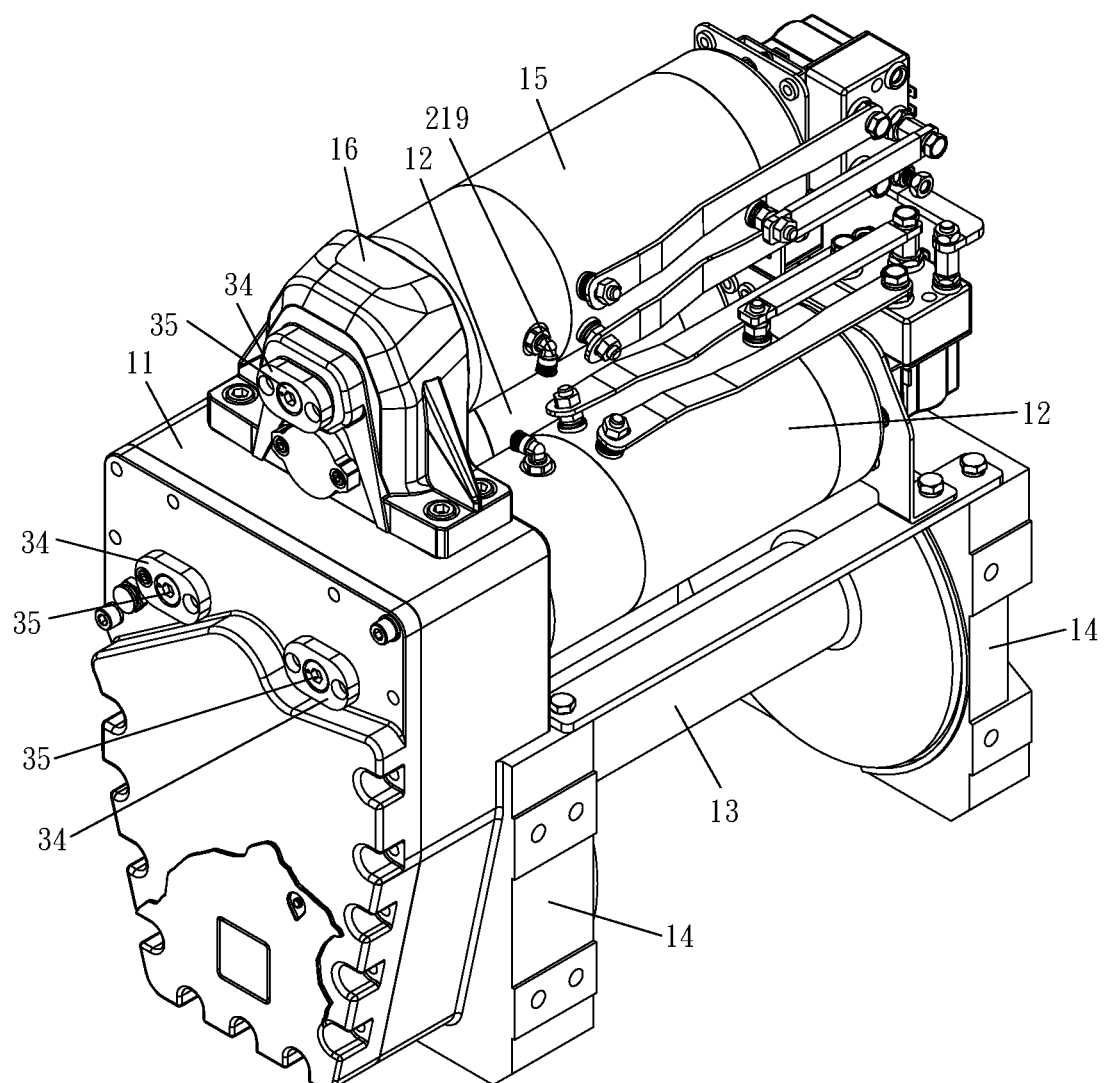
FIG. 13 is a perspective view of a tri motor power winch used as an example for illustrating the present invention.
Figure 14:
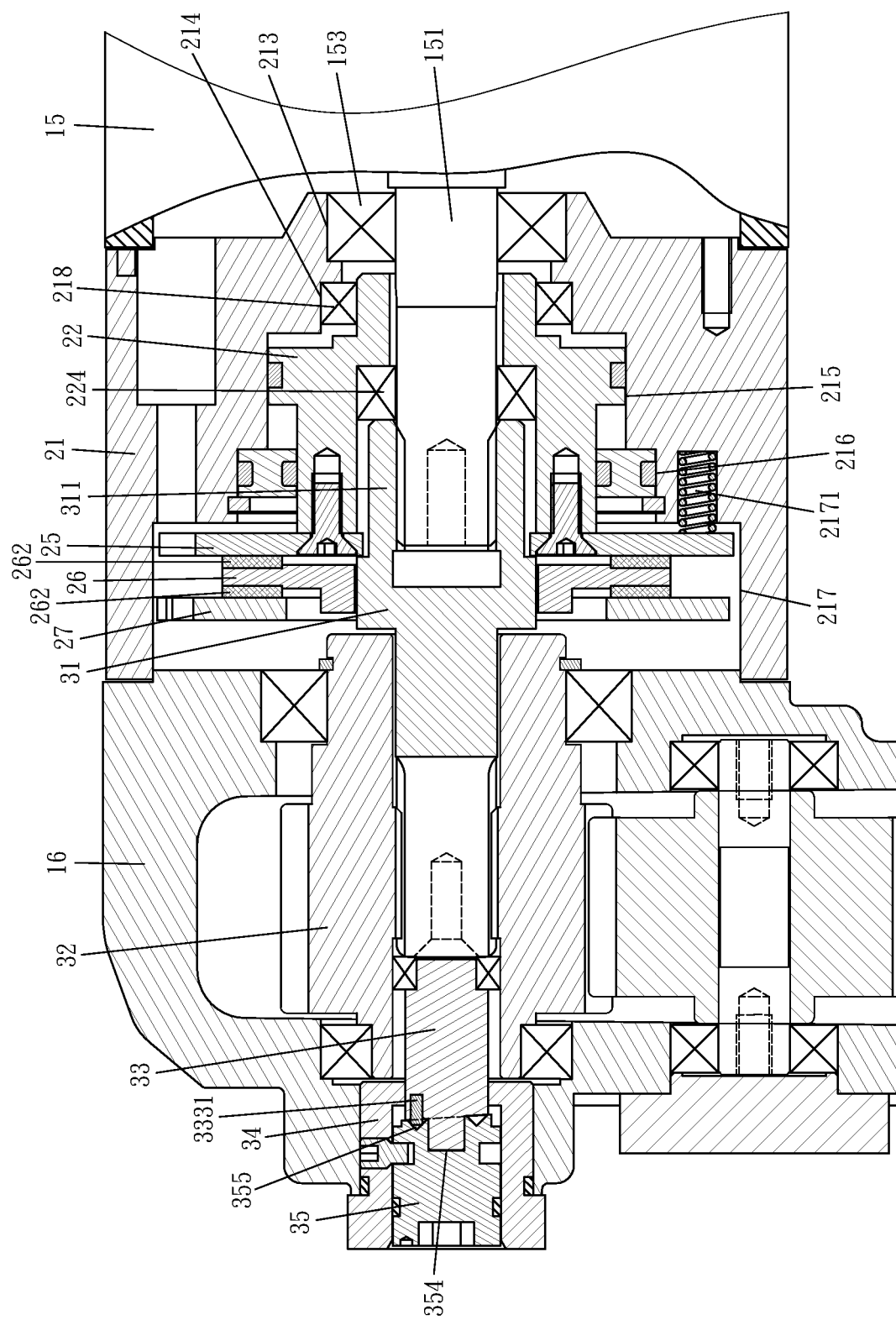
FIG. 14 is a cross-sectional view of the assembly of a tri motor power winch used as an example for illustrating the present invention.

In FIGS. 13 and 14, the tri motor power winch also includes a transmission box 11, a dual motor 12, a rope wheel 13 and a support base 14, and further includes a third motor 15 that can be installed conveniently on the dual motor 12, and the third motor 15 is mounted onto the top of the transmission box 11 and supported by a support housing 16, and the third motor 15 is also coupled to a brake device 2 and a release mechanism 3. For simplicity, the respective components use the same respective numerals in the drawings and specification.

Figure 15:
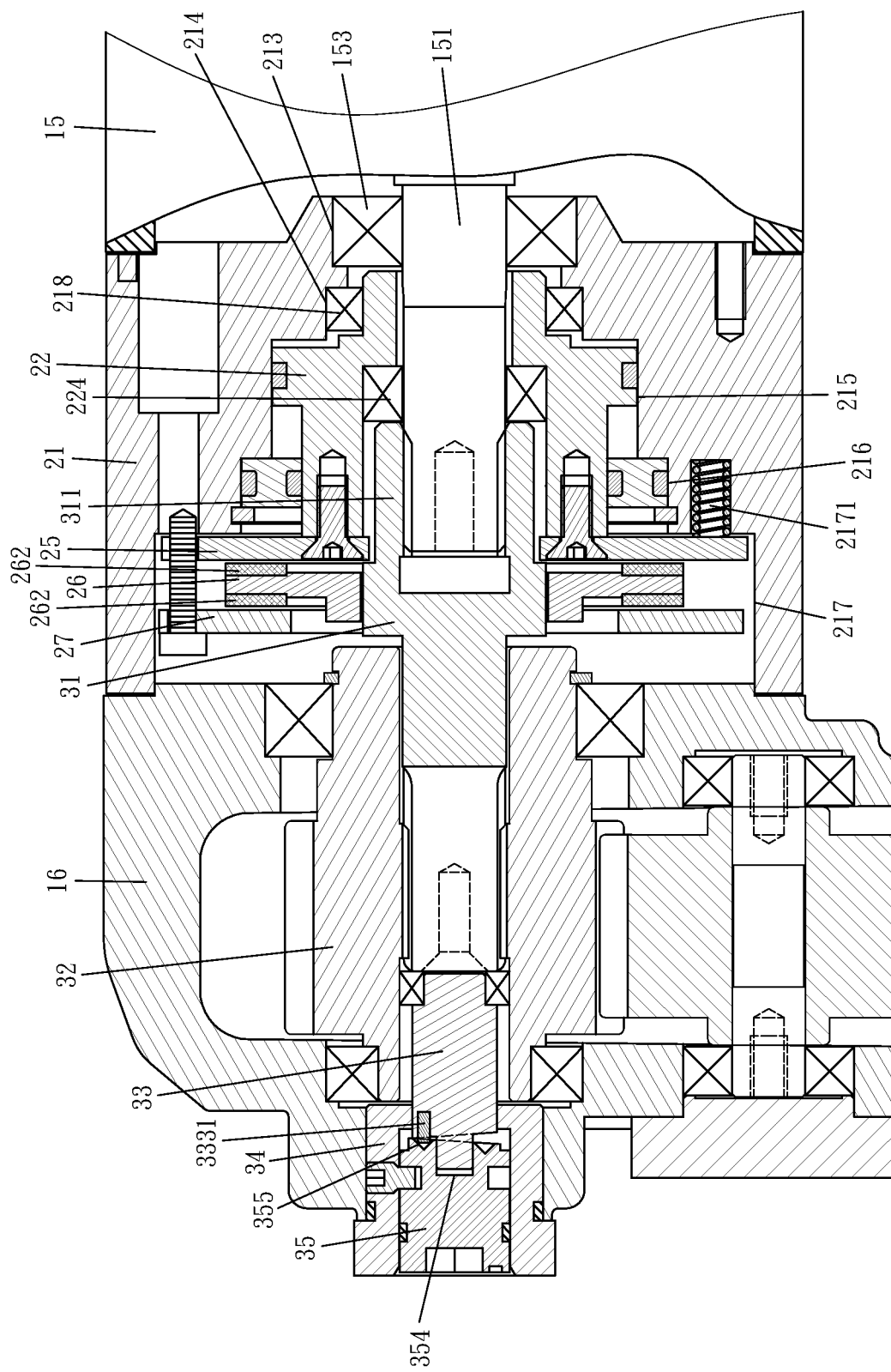
FIG. 15 is a schematic view showing a brake releasing effect of a tri motor power winch used as an example for illustrating the present invention.

In FIGS. 14 and 8a, the pushing slope 356 and the pushed slope 334 are situated at a slope tight contact status, so that the second friction disc 27, the brake disc 26 and the first friction disc 25 are attached to each other closely to produce a braking effect. Now, the polygonal rotating rod is installed into the concave polygonal rotating slot 353 of the release knob 35 to drive the release knob 35 to rotate for 180 degrees as shown in FIGS. 15 and 11a, and the rotation of the pushing slope 356 forces the pushed slope 334 and the push rod 33 to move a small distance towards the first friction disc 25, so that a gap is produced between the second friction disc 27, the brake disc 26 and the first friction disc 25 to eliminate the braking effect, and this operation and effect are the same as those described above.

In general, a machine usually includes a brake device used in the power transmission process, and the present invention includes a release mechanism coupled to the brake device and used for eliminating the braking effect of the brake device when needed, so that the machine can be operated to complete a stroke to improve the safety of use.

In summation, the present invention complies with the patent application requirements, and thus is duly filed for patent application. While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A release mechanism of a brake device used in a power transmission process, and a motor providing power to the power transmission process, and an output shaft of the motor being coupled to the brake device, and the brake device being formed by at least one friction disc and a brake disc, and the brake disc having a lining installed on a side thereof and facing the friction disc, and a side of the brake disc is acted by an elastic member and attached with the friction disc to produce a braking effect, characterized in that a release mechanism is provided and coupled to the brake device, and the release mechanism comprises a positioning component, a release knob and a push rod, and the positioning component is installed at a machinery surface, and a front side has a positioning hole communicated with a via formed at a rear side; the release knob is passed and placed into a positioning hole of the positioning component, and an outer front side has a concave polygonal rotating slot, and an inner sidewall has a pushing slope with an inclination, and a center has a cylindrical groove; a front-end wall of the push rod has a pushed slope with an inclination, and a front end of the push rod has a front round push shaft extended outwardly therefrom, and an interval with a small distance exists between the positioning rod and the front round push shaft; a front round push shaft of the push rod is inserted into the cylindrical groove of the release knob, and when the pushing slope of the release knob and the pushed slope of the push rod are in a slope tight contact status, a rear end of the push rod and the friction disc have a direct or indirect connection relation; the release knob is driven to rotate from the concave polygonal rotating slot, and the pushing slope forces the pushed slope and the push rod to push the friction disc and the brake disc to produce a gap.

2. The release mechanism as claimed in claim 1, wherein the positioning component has a side positioning hole formed on a side thereof and inwardly accessed, and a circular positioning groove formed on a side of the release knob and configured to be corresponsive to the side positioning hole, and when the release knob is passed and placed into the positioning hole of the positioning component, a positioning member is passed and placed into the side positioning hole and pressed and positioned into the circular positioning groove.

3. The release mechanism as claimed in claim 1, wherein the release knob has a group of symmetrical positioning slots formed on an inner sidewall thereof and at the periphery of the cylindrical groove, and a positioning rod erected from the front end of the push rod and adjacent to the front round push shaft, and the positioning rod is pressed and positioned into one of the positioning slots.

* * * * *